(Model.)
C. F. BRUSH.
THERMIC REGULATOR FOR ELECTRIC CURRENT GENERATORS.
No. 260,651. Patented July 4, 1882.
3 Sheets—Sheet 1.
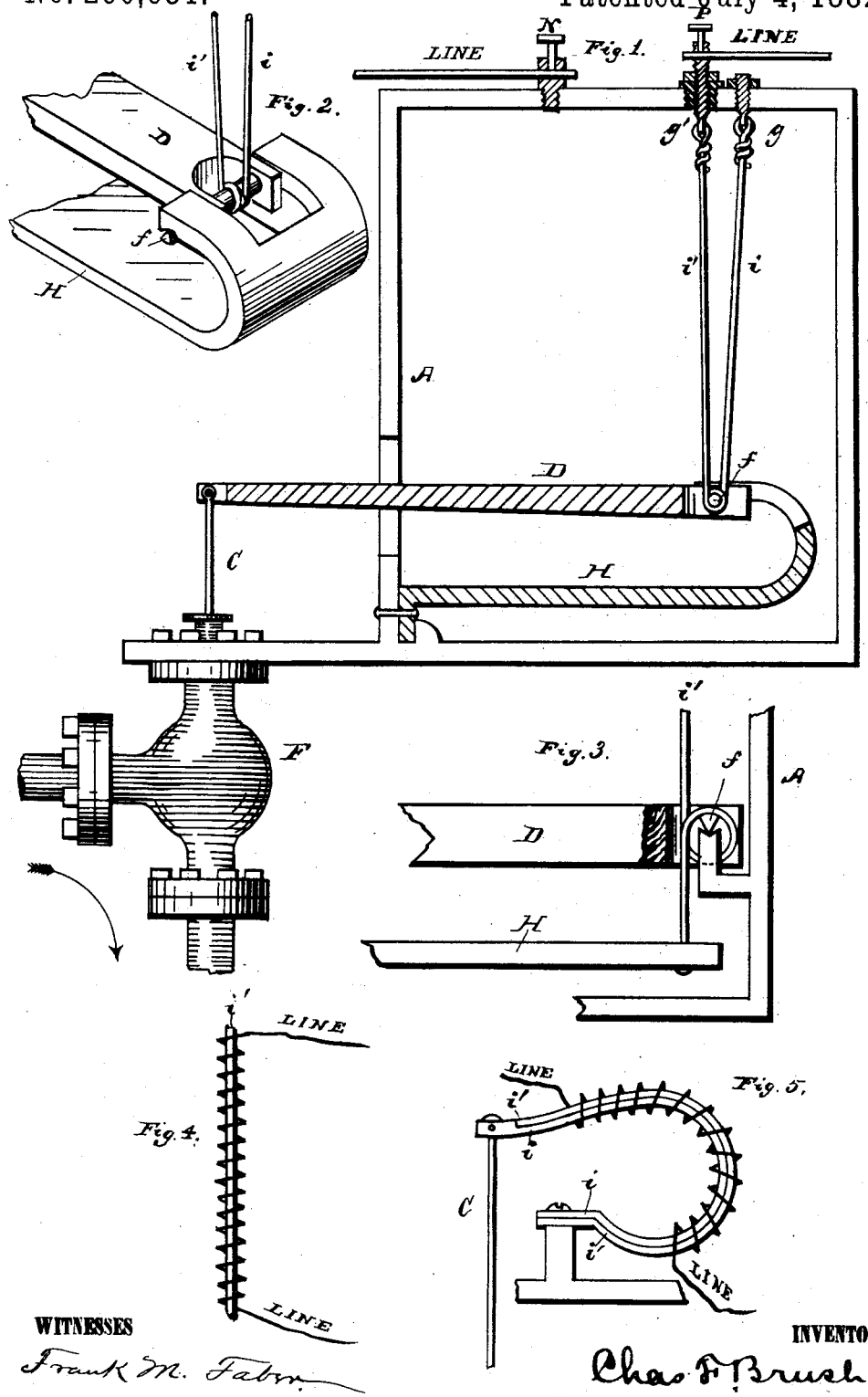
WITNESSES
Frank M. Fabr.
Albert L. Lawrence.
INVENTOR
Chas. F. Brush.
By Leggett & Leggett
ATTORNEY

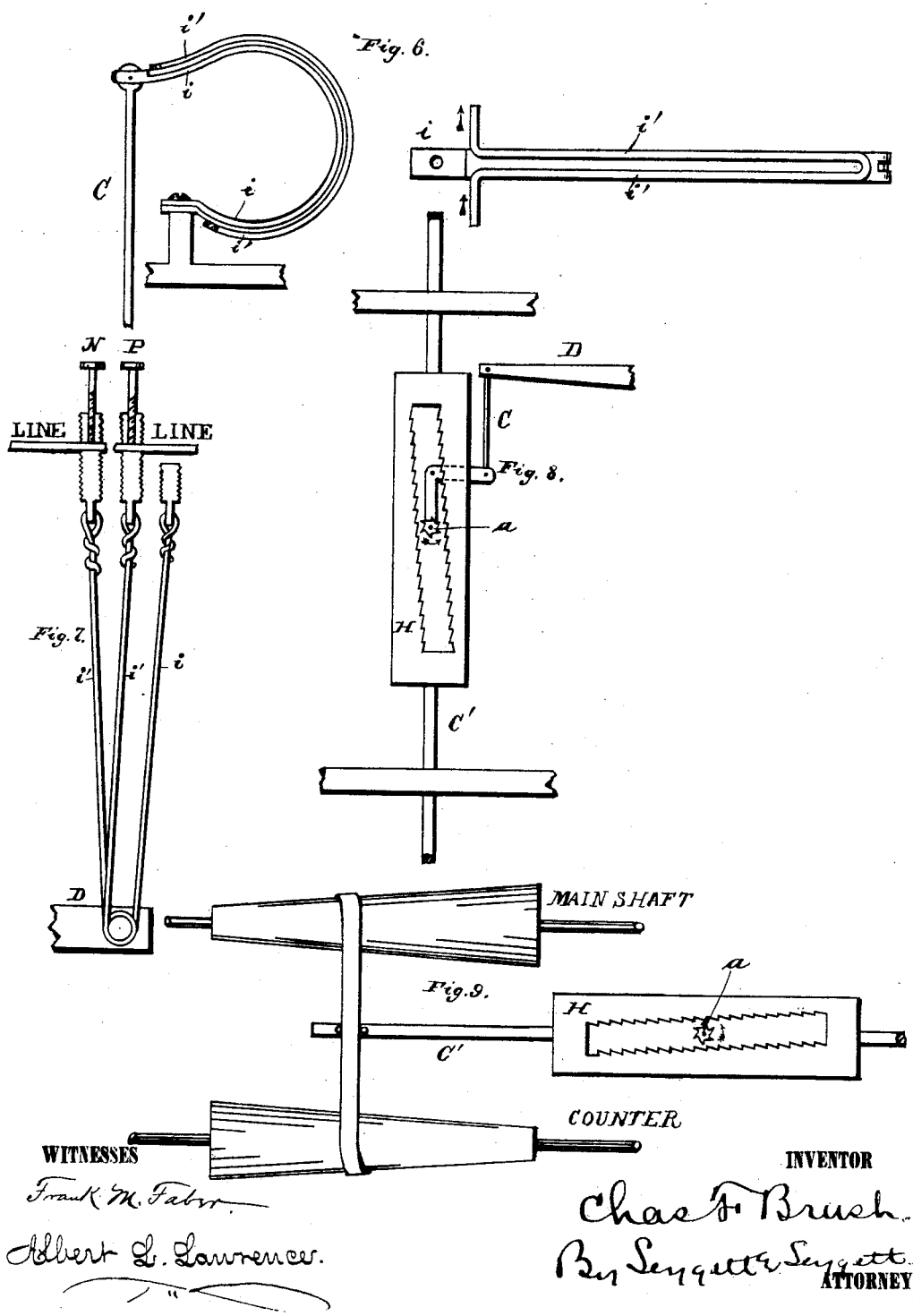

(Model.)
C. F. BRUSH.
THERMIC REGULATOR FOR ELECTRIC CURRENT GENERATORS.
No. 260,651. Patented July 4, 1882.
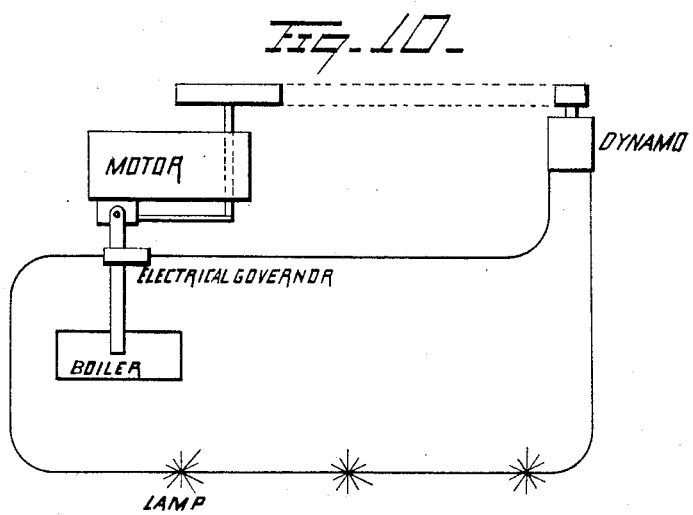
WITNESSES
INVENTOR

UNITED STATES PATENT OFFICE.

CHARLES F. BRUSH, OF CLEVELAND, OHIO.

THERMIC REGULATOR FOR ELECTRIC-CURRENT GENERATORS.

SPECIFICATION forming part of Letters Patent No. 260,651, dated July 4, 1882.

Application filed July 16, 1880. (Model.)

*To all whom it may concern:*

Be it known that I, CHARLES F. BRUSH, of Cleveland, in the county of Cuyahoga and State of Ohio, have invented certain new and useful Improvements in Thermic Regulators for Electric-Current Generators; and I do hereby declare the following to be a full, clear, and exact description of the invention, such as will enable others skilled in the art to which it pertains to make and use it, reference being had to the accompanying drawings, which form part of this specification.

My invention relates to dynamo-electric machines, and has for its object the automatic control of the driving-power applied to such apparatus, whereby the speed of armature-rotation is regulated in accordance with the requirements of the external circuit, so that a uniform, or nearly uniform, current strength may be maintained while the circuit-resistance varies.

I accomplish my object by employing an electro-thermal apparatus actuated by the external current of the machine to regulate the admission of steam or water, as the case may be, to the driving-engine. Increase of current in the circuit acts to diminish the supply of motive agent, and thus to decrease the speed of the dynamo-machine until the normal current-volume is restored, while decrease of current produces the contrary effect.

In the drawings, Figure 1 shows my automatic apparatus applied as a governor to a steam-engine. Fig. 2 is an enlarged view of a portion of the mechanism shown in Fig. 1. Fig. 3 shows a device wherein a single wire, $i'$, is employed instead of two, as before. Fig. 4 shows the wire $i'$ heated indirectly by the passage of current through a helix surrounding it. Fig. 5 shows a combination of two unequally-expansible metals heated indirectly by the current. Fig. 6 shows a combination of two strips of metal, one of them being heated directly by the passage of current through it. Fig. 7 shows how the wire $i'$, Fig. 1, may be duplicated to increase the strength of the apparatus. Fig. 8 shows auxiliary motor mechanism for working large valves, water-gates, &c., the whole controlled by my electro-thermal apparatus. Fig. 9 shows my auxiliary mechanism adapted to shift belts on coned pulleys. Fig. 10 shows a dynamo-electric machine with its external circuit containing working devices, a motor for driving the dynamo-machine, and a regulator.

In Fig. 1, D is an arm or lever, provided at one end with a cylindrical cross-piece of steel or other suitable material, $f$, as shown enlarged in Fig. 2. The projecting ends of this cross-piece are formed into blunt knife-edges, as shown.

A wire, $i\,i'$, of suitable size and preferably of soft steel, is passed through a small hole in the central part of the cross-piece or fulcrum $f$, and each half of the wire is then passed once or twice around the cylindrical portion of the cross-piece in opposite directions. The ends of this wire are then carried up and attached to the studs $g\,g'$, as shown in Fig. 1. These studs are threaded and provided with nuts above the frame A, as shown. The stud $g'$ is insulated from the frame A by means of a bushing, through which it passes, and its upper end forms the binding-post P. The lower end of the wire $i'$ is electrically connected with the binding-post N through the fulcrum $f$, spring H, and frame A. Thus, by means of the binding-posts P N, the wire $i'$ is included in the line or external circuit of the dynamo-electric machine whose speed is to be governed.

H is a very stiff spring, of steel or other metal, attached to the frame A and split at its free end so as to engage with and form a support for the knife-edges at the extremities of the fulcrum $f$. The wires $i\,i'$, being sufficiently strained by means of the screw-studs $g\,g'$, hold the lever D firmly against the spring H, and in the position shown in the figure. At the other end of the lever D is pivoted a valve-stem, C, forming part of an ordinary steam governor-valve, F. This valve controls the admission of steam to the engine which drives the dynamo-electric machine or machines in whose working-circuit the wire $i'$ is located.

When my device is in operation the wire $i'$ will become more or less heated by the passage of current through it, and will expand accordingly, while the wire $i$ remains as before. The cylindrical portion of the fulcrum $f$, being partially relieved of its support on one side, will be carried downward by the powerful spring H, the free end of the lever D will be depressed, and with it the valve-stem C. The length of the wires $i\ i'$ is so adjusted by means of the screw-studs $g\ g'$ that when $i'$ is expanded by the passage of the normal volume of current through it the valve-stem C shall be in a position to admit just sufficient steam through the valve F to drive the engine and dynamo-machine attached thereto at a sufficient speed to maintain the aforesaid normal volume of current in circulation. If now the line-resistance is reduced from any cause, the increase of current thereby produced in the circuit including the wire $i'$, will further heat the latter, allowing the valve-stem C to be depressed by the lever D and spring H, thus throttling the steam at the governor-valve F and reducing the speed of the engine and dynamo-machine until the current in the circuit is nearly or quite reduced to its normal strength. If, on the other hand, the circuit-resistance is increased by inserting more electric lights or otherwise, the weakening of the current thereby occasioned allows the wire $i'$ to partially cool and contract, thus raising the stem C and admitting more steam to the engine, which accordingly increases its speed until the normal current strength in the circuit is nearly or quite restored.

A notable feature of the mechanism shown in Fig. 1 is the use of two wires, $i\ i'$, of the same metal. This feature I have styled my "compensating device." It insures the normal working of the apparatus at all temperatures, since it is the difference in temperature between the wires $i\ i'$ and not the actual temperature of $i'$ which determines the working of the apparatus. In ordinary working the temperature of the whole apparatus gradually rises considerably, and of course the absolute temperature of the wire $i'$ augments accordingly without any increase of current through it; and were it not for my compensating device the operation of the governor would be seriously affected from this cause.

Fig. 7 indicates how two or more wires, $i'$, may be employed instead of one, as before shown, the current passing through them successively. Thus greater available working strength may be secured to the apparatus. The wire may likewise be multiplied or increased in size.

Fig. 3 shows one of several forms of device in which but one wire, $i'$, is employed. This device will evidently perform all the functions described in connection with Fig. 1, except compensation for changes of general temperature.

The wires $i\ i'$ may be replaced by thin ribbons of metal, and this is even desirable, so far as that portion which passes around the fulcrum $f$ is concerned, on account of greater flexibility; or this part may be ribbon and the rest wire.

The wire $i'$ may be surrounded by a long helix, through which the current passes, while being itself insulated from the current, and thus be heated indirectly by the latter. Fig. 4 shows such a modification.

Instead of employing wires $i\ i'$, as in Fig. 1, I may use narrow sheets of metal connected rigidly together, side by side, and insulated from each other both thermally and electrically. The pair may be used straight, curved, or coiled, as in Fig. 6, which shows this form of device. Here the expansion of the outer strip of metal, $i'$, by the heat due to the passage of current through it, while the inner strip, $i$, remains unheated, operates to depress the valve-stem C. This arrangement of parts evidently embodies my compensating device, and is a mere modified form thereof.

Fig. 5 shows a device similar to Fig. 6; but the strips $i\ i'$ are of different metals, expanding unequally on the application of heat. They are riveted or soldered together, the metal $i'$ being the more expansible of the two, and both are heated either by the passage of current through them or by the passage of current through a helix surrounding them, as shown in the figure. The operation of the device is evident, but it lacks the compensating feature, which was retained in the device shown in Fig. 6.

My invention is equally useful with rapidly intermittent, alternating, or continuous currents, and I do not limit myself to any particular manner of applying current to heat the wire $i'$ or its equivalent. Any suitable form of throttle-valve F, Fig. 1, may be employed.

Instead of utilizing the motion of the stem C to throttle the steam admitted to the engine to be controlled, it may be employed to regulate the point of cut-off of the steam in the cylinder by any of the methods customary with engines of the automatic cut-off class. This of course is the more desirable manner of applying my invention, especially in the case of large engines, since the same economy of steam will be effected that obtains when the engines are governed by centrifugal action in the ordinary manner.

I have illustrated my invention applied as a throttling-governor instead of as a cut-off governor for the sake of simplicity merely, and do not in any manner limit myself to the particular form or application shown.

In order to prevent the engine racing when the working-circuit of the dynamo machine or machines which it is driving becomes of abnormally-high resistance or is broken, an ordinary centrifugal governor may be employed in combination with my electrical governor. The centrifugal governor is so adjusted that it does not begin to control the flow of steam until the engine has passed beyond its normal maximum rate of speed. Thus when conditions arise, accidentally or otherwise, under which the electrical governor cannot properly perform its function this auxiliary centrifugal governor comes into action.

I have thus far described my apparatus as applied to the automatic control of the speed of dynamo-electric machines driven by steam-power only; but that it is equally applicable when water-power is employed must be obvious. In the case of water-power the available mechanical force of the lever D will not be sufficient to operate the gate controlling the flow of water, and some auxiliary mechanism furnishing the required mechanical power, but controlled by the electrical apparatus, must be employed. Fig. 8 shows one convenient form of such mechanism. Here the valve or gate stem C' is made of suitable size and strength, and instead of being attached directly to the arm D is attached to a frame, H. The sides of this frame form two toothed racks parallel with each other, but not so with the line of motion of the frame. The lever D and stem C control the lateral position of a ratchet-wheel, $a$, of such size that it can just revolve between the racks forming the sides of the frame H without engaging with either. This ratchet-wheel is attached to the end of a jointed or flexible shaft or spindle, (not shown,) by means of which it is connected with the motive power which is being governed, or with other motive power, from which it receives a slow rotary motion in the direction indicated by the arrow, while at the same time it is free to be carried to the right or left by motion of the lever D. Now, when the lever D rises the ratchet-wheel $a$ engages with the right-hand rack of the frame H, and the latter, together with the stem C', is carried upward until the rack, owing to its oblique motion, ceases to engage the ratchet-wheel $a$. When the arm D falls the wheel engages with the other rack, and the stem C' is depressed. Thus the stem C' is caused to rise and fall much or little with the arm D, and may overcome great mechanical resistance without taxing the electro-thermal part of the apparatus. This auxiliary mechanism may also be employed to work the governing-valves or cut-off mechanism of large steam-engines where the friction of parts is considerable.

In the case of water-wheels, as with steam-engines, it is always advisable to employ an auxiliary governor, as and for the purpose already specified in connection with the steam apparatus.

Other auxiliary governing apparatus controlled by my electro-thermal device may be employed either of electrical or of purely mechanical nature; but as I have sufficiently indicated the principle involved I will not describe further modifications.

The application of my invention to gas and other heat engines, wind-wheels, &c., when employed to drive dynamo-electric machines, is too obvious to require explanation.

The mechanism shown in Fig. 8, or its equivalent, may further be employed to control and vary the speed of dynamo-electric machines, while the speed of the primary driving-power remains constant. One method of accomplishing this result is illustrated in Fig. 9. Here power is transmitted from the main shaft to the counter-shaft by means of a belt traveling on oppositely-coned pulley, as shown. The belt is shifted as required by means of the stem or rod C', actuated in the manner already specified in connection with Fig. 8, so that while the speed of the main shaft remains constant that of the counter-shaft and dynamo-machine driven therefrom may be suitably varied and controlled.

What I claim is—

1. In a system for generating and applying an electric current, the combination of a dynamo-electric machine, a motor for driving said dynamo-electric machine, an external or working circuit, upon which is placed one or more electric lamps, electric motors, or any devices to be operated upon or actuated by the electric current, and a governor consisting of an electro-thermal device energized by the said electric current associated with suitable valve or cut-off mechanism, said governor constructed and adjusted to control the speed at which the said dynamo-electric machine is driven, substantially as shown.

2. The combination, with a dynamo-electric machine and devices for regulating the speed of the dynamo-electric machine, of an electro-thermal device arranged and adapted to be energized by the electric current, and to actuate or control the speed-regulating devices of said dynamo-electric machine, substantially as set forth.

3. The combination, with a motor for driving a dynamo-electric machine, of an electro-thermal device influenced by the current of said dynamo-electric machine, and a valve mechanism controlled by said electro-thermal device to govern the admission of steam, water, or equivalent driving agent to said motor, and thus to govern its speed in accordance with the varying requirements or resistance of the circuit of the said current, substantially as shown.

4. The combination, with the working-circuit of a dynamo-electric machine and devices for regulating the speed of the dynamo-electric machine, of the wires $i\ i'$, or their equivalents, adapted by their difference in temperature to actuate or control said speed-regulating devices, substantially as set forth.

In testimony whereof I have signed my name to this specification in the presence of two subscribing witnesses.

CHARLES F. BRUSH.

Witnesses:
LEVERETT L. LEGGETT,
JNO. CROWELL, Jr.